(12) United States Patent
Smith (10) Patent No.: US 12,276,302 B2
(45) Date of Patent: Apr. 15, 2025

(54) APPARATUS AND METHOD FOR REPAIR OF SHIFT CABLE ENDS IN VARIOUS MOTOR VEHICLES

(71) Applicant: Loring Smith, Lakeland, FL (US)

(72) Inventor: Loring Smith, Lakeland, FL (US)

( * ) Notice: Subject to any disclaimer, the term of this patent is extended or adjusted under 35 U.S.C. 154(b) by 0 days.

(21) Appl. No.: 17/853,611

(22) Filed: Jun. 29, 2022

(65) Prior Publication Data

US 2024/0003379 A1    Jan. 4, 2024

(51) Int. Cl.
  *F16C 1/14*    (2006.01)
  *F16C 43/02*   (2006.01)
  *F16H 59/02*   (2006.01)

(52) U.S. Cl.
  CPC .............. *F16C 1/145* (2013.01); *F16C 43/02* (2013.01); *F16H 59/02* (2013.01)

(58) Field of Classification Search
  CPC ....................................................... F16C 1/145
  See application file for complete search history.

(56) References Cited

U.S. PATENT DOCUMENTS

2015/0330499 A1* 11/2015 Smith ..................... F16H 61/36
                                                              29/898.07

OTHER PUBLICATIONS https://www.bushingfix.com/ford-f-250-automatic-transmission-shift-lever-linkage-replacement-bushing/ Wayback Machine Screenshot (Year: 2021).*
https://www.youtube.com/watch?v=hCYqPQOSVmUpdf (Year: 2021).*

* cited by examiner

*Primary Examiner* — Jason L Vaughan
*Assistant Examiner* — Amanda Kreiling
(74) *Attorney, Agent, or Firm* — Todd A. Jennings (57) ABSTRACT

The present invention is directed at a specialized bushing for use in coupling the shift cable end with the shift lever in various motor vehicles wherein the shift cable end is comprised of a coupling member having a coupling aperture, and the shift lever is comprised of an elongated member having a tapered portion, a cylindrical portion and a head. The bushing preferably includes a seating member configured to sit within the shift cable end having a bore configured to receive a portion of the elongated member of the shift lever, a leading and trailing shoulder to radially and longitudinally secure the seating member within the shift cable end, and a securing member to receive and house the tapered and cylindrical portions of the shift lever and permit the head of the shift lever to be pushed through and beyond the securing member to secure the shift lever within the bushing.

8 Claims, 10 Drawing Sheets

APPARATUS AND METHOD FOR REPAIR OF SHIFT CABLE ENDS IN VARIOUS MOTOR VEHICLES

CROSS-REFERENCES TO RELATED APPLICATIONS

Not Applicable

STATEMENT REGARDING FEDERALLY SPONSORED RESEARCH

Not Applicable.

NAMES OF PARTIES TO JOINT RESEARCH AGREEMENT

Not Applicable

REFERENCE TO A SEQUENCE LISTING

Not Applicable.

BACKGROUND OF THE INVENTION

(1) Field of Invention

The present invention relates to an apparatus and method for repairing the transmission shift control linkage of various motor vehicles. The transmission shift control linkage of many motor vehicles generally consists of a shift cable that connects the gear selector or shift lever to the motor vehicle's transmission. The shift cable end is coupled with the gear selector or shift lever via a coupling mechanism that allows for the smooth operation of the shift linkage. In many motor vehicles, the factory-installed shift cable ends are pre-fitted with a factory-made coupling mechanism consisting of metal or plastic clips or similar appurtenances that engage the coupling member of a shift lever and allow for the coupling of a shift lever to the shift cable end. These factory-made coupling mechanisms, which are made a part of the shift cable ends, degrade or become damaged over time, allowing the shift cable end to become decoupled from the gear selector or shift lever, making it impossible for the operator of the automobile to engage the shift and the transmission. Presently, the failure of a transmission shift cable end coupling mechanism in various motor vehicles requires the removal and replacement of the entire shift cable. This is because the factory-made coupling mechanisms that are incorporated into the shift cable ends are not capable of being replaced or repaired. The replacement of the shift cable to achieve the repair of the shift cable end coupling mechanism can prove unnecessarily costly and time consuming.

(2) Background Art

There are a large number of bushings in wide use in many fields. However, there are not many bushings in the art related to the specific use in transmission shift cable assemblies. The present inventor has previously disclosed in U.S. Pat. Nos. 10,619,723, 10,215,273, application Ser. No. 17/206,001, and application Ser. No. 17/703,445 apparatuses and methods for repairing the couplings between multiple shift cable ends and shift levers in various motor vehicles. However, the shift cable ends and specialized bushings disclosed in these prior patents were materially different from the apparatus and method disclosed in the instant invention.

SUMMARY OF INVENTION

Accordingly, it is the object of the present invention to provide a specialized bushing and method of installation into the transmission shift cable end that provides for the proper coupling of the shift cable end and shift lever without the replacement of the entire shift cable. In accordance with the invention, the replacement of the factory-made shift cable end coupling mechanism is achieved by a method utilizing a specialized bushing that properly couples the shift lever to the shift cable end and avoids the time and costs associated with the replacement of the entire shift cable.

The object of the invention may be accomplished by inserting a specialized bushing into the shift cable end and inserting the shift lever into the bushing. In particular embodiments, such a shift cable end may comprise a coupling member having a coupling aperture, and such a shift lever may comprise an elongated member having a tapered portion, a cylindrical portion and a head. Such a bushing, may, for example, be comprised of a seating member configured to sit within the coupling aperture of the bushing, a leading shoulder and trailing shoulder at opposite ends of the seating member configured to radially and axially align the seating member within the coupling aperture, a bore running lengthwise through the seating member configured to receive at least a portion of the elongated member of the shift lever, and a securing member configured to receive and house the tapered portion and cylindrical portion of the shift lever and allow the head of the shift lever to extend through and over the securing member, thereby securing the shift lever in the bushing.

DETAILED DESCRIPTION

Certain factory-installed shift cable ends in various motor vehicles are pre-fitted with a factory-made coupling mechanism for coupling a shift lever to the shift cable end. These factory-made coupling mechanisms, which generally consist of plastic clips or similar appurtenances, degrade over time and their replacement requires the installation of a new shift cable to include a new shift cable end. The replacement of the entire shift cable as a means of repairing a degraded shift cable end coupling mechanism is the generally accepted method because there is no known method for repairing the shift cable end coupling mechanism that ensures the proper coupling of the shift lever and shift cable end. Thus, it remained for the present inventor to recognize that designing a bushing for coupling the shift lever with an existing shift cable end and a method for its installation into a transmission shift cable end would provide an alternative to replacing the entire shift cable end and result in lower supply and labor costs.

Figure 1:
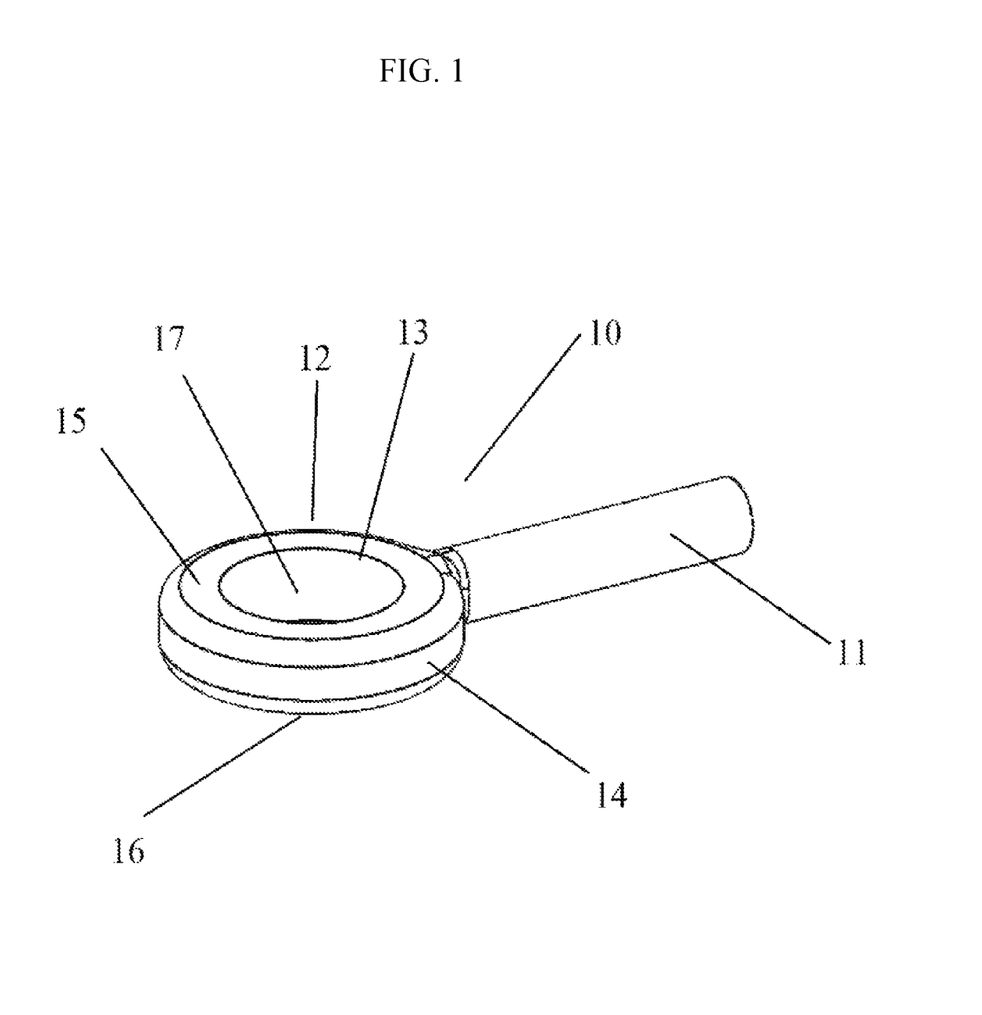
FIG. 1 is a perspective illustration showing the details of an exemplary shift cable end.

Referring to FIG. 1, an exemplary transmission shift cable end 10 for a motor vehicle (not shown) is illustrated. The shift cable end 10 operably couples the shift lever 20 with the shift cable (not shown) and allows the shift lever 20 to engage the transmission (not shown). This particular example of a shift cable end 10 includes a connecting member 11 that connects the shift cable (not shown) to the shift cable end 10, and a coupling member 12 adapted to carry a bushing to couple with the shift lever 20. In this particular embodiment, the coupling member 12 is circular. The coupling member 12 has an inner surface 13 and an outer surface 14 that forms a coupling aperture 17, and a top surface 15 and a bottom surface 16. The shift lever 20 is inserted into the shift cable end 10 to operably couple with the shift cable (not shown).

Figure 2:
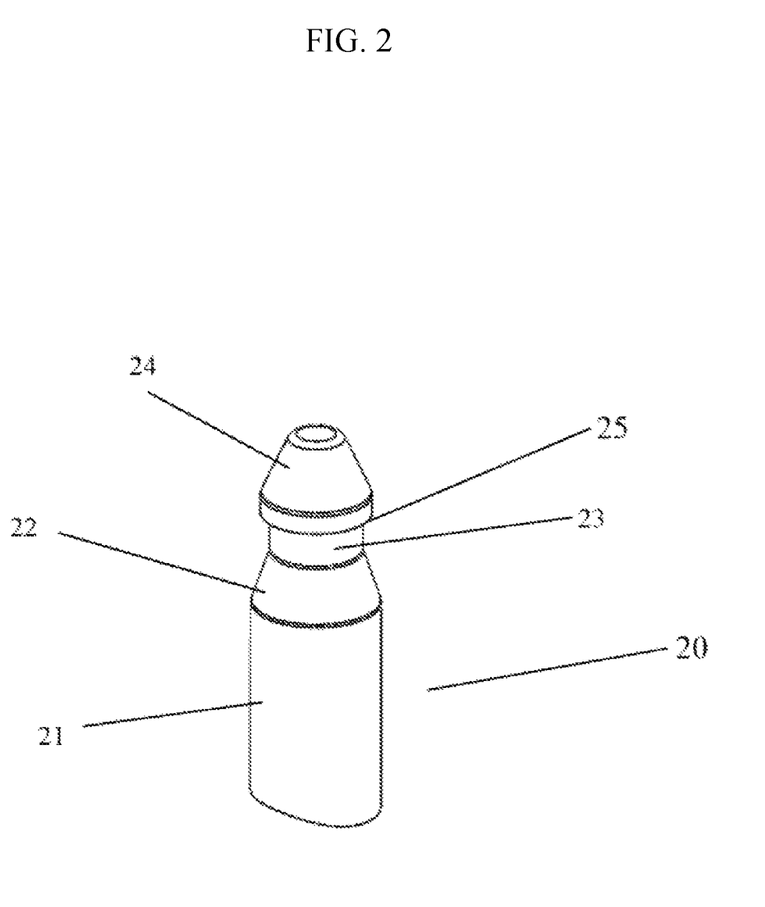
FIG. 2 is a perspective illustration showing the details of an exemplary shift lever.
Figure 3A:
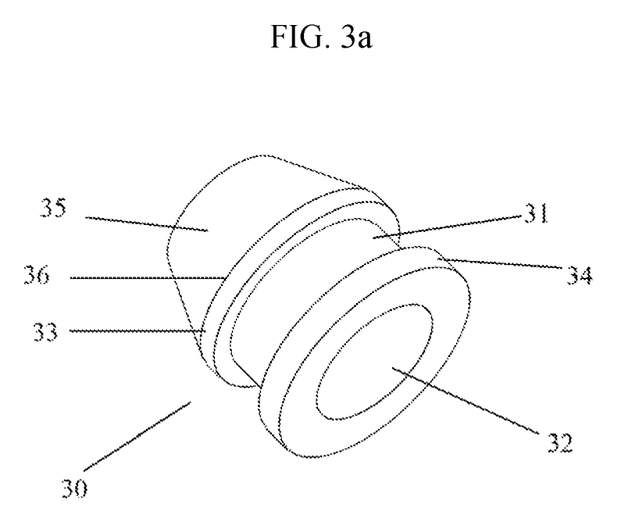
FIG. 3a is a perspective illustration of an exemplary bushing.
Figure 3B:
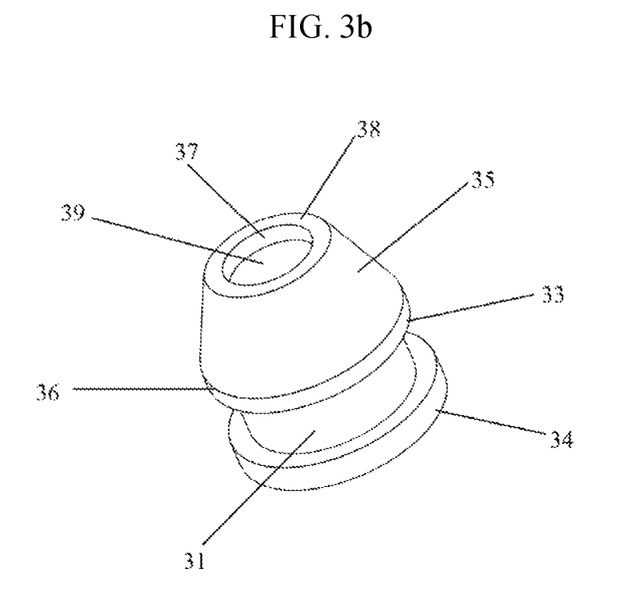
FIG. 3b is a perspective illustration of an exemplary bushing.
Figure 4A:
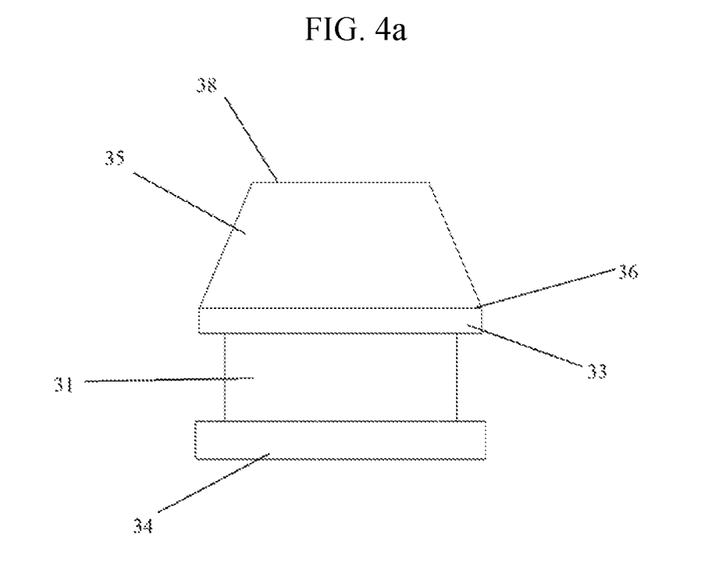
FIG. 4a is a side elevation illustration of an exemplary bushing.
Figure 4B:
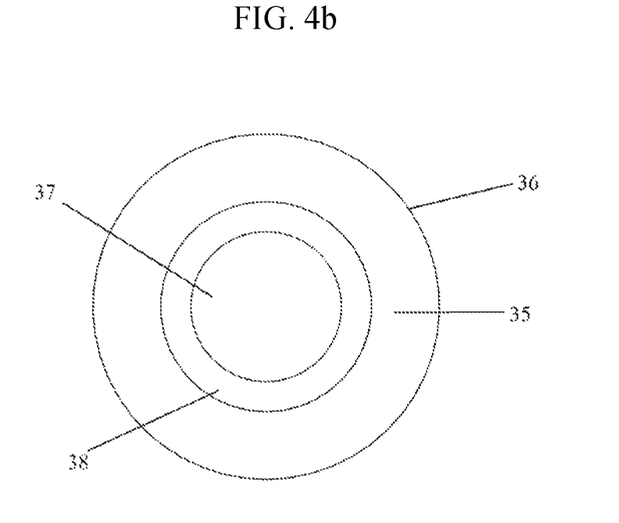
FIG. 4b is a top elevation illustration of an exemplary bushing.
Figure 4C:
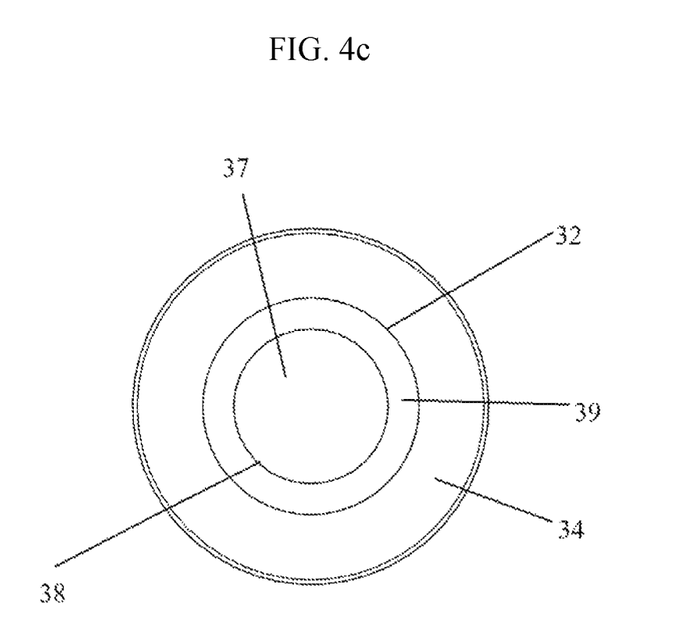
FIG. 4c is a bottom elevation illustration of an exemplary bushing.

Referring to FIG. 2, an exemplary shift lever 20 is illustrated. The shift lever 20 is inserted into the shift cable end 10 to operably couple with the shift cable (not shown) through the use of a bushing. This particular example of a shift lever includes an elongated member 21 having a tapered portion 22, a cylindrical portion 23, and a head 24. In this particular embodiment, the head 24 is a truncated cone. The cylindrical portion 23 is of a diameter less than the diameter of the base 25 of the head 24 and less than the diameter of the elongated member 21 such that the tapered portion 22 and cylindrical portion 23 form a notch between the elongated member 21 and head 24.

Referring to FIG. 3a, FIG. 3b, FIG. 4a, FIG. 4b, FIG. 4c and FIG. 5, an exemplary bushing 30 is illustrated. The bushing 30 is comprised of a seating member 31 of a size and shape approximately equivalent to the size and shape of the coupling aperture 17 of the shift cable end 10. In this particular embodiment, the seating member 31 is cylindrical and of a diameter approximately equivalent to the diameter of the coupling aperture 17. When installed, the seating member 31 sits within the coupling aperture 17 of the shift cable end 10. The seating member 31 has a bore 32, and a leading shoulder 33 and a trailing shoulder 34 extending radially from its surface. The longitudinal distance between the leading shoulder 33 and trailing shoulder 34 is marginally greater than the depth of the coupling aperture 17 such that, when installed in the shift cable end 10, the leading shoulder 33 engages the top surface 15 of the coupling member 12 and the trailing shoulder 34 engages the bottom surface 16 of the coupling member 12. In this particular embodiment, the leading shoulder 33 and trailing shoulder 34 are cylindrical and of a diameter greater than the diameter of the seating member 31 and coupling aperture 17. The leading shoulder 33 and trailing shoulder 34 work in tandem to radially and longitudinally secure the bushing 30 in the coupling aperture 17.

Figure 5:
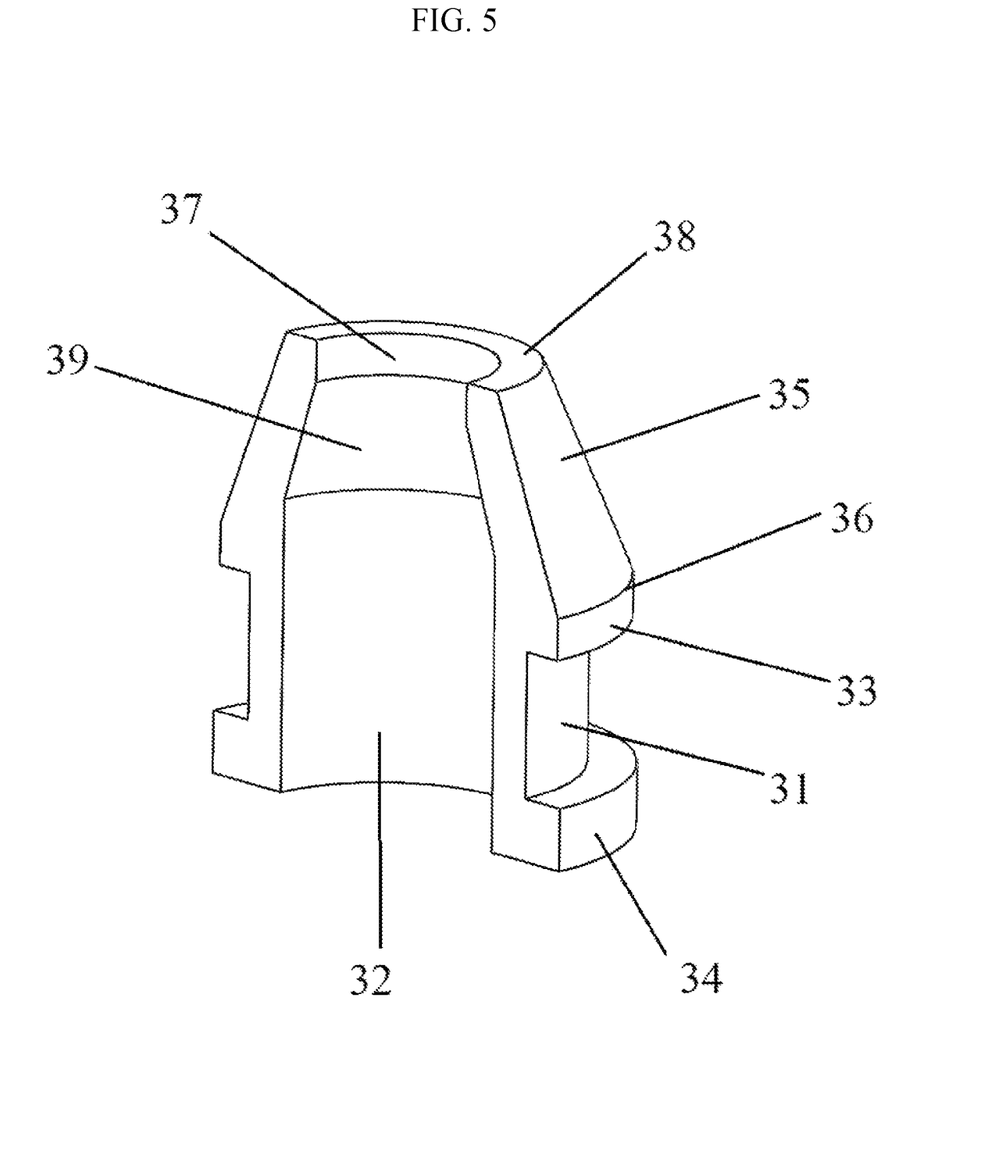
FIG. 5 is a cross-sectional illustration of an exemplary bushing.

The leading shoulder 33 of the bushing 30 carries a securing member 35 for engaging and securing the shift lever 20 within the bushing 30 and thus the shift cable end 10. In this particular embodiment, the securing member 35 is a truncated cone. The conical shape of the securing member 35 permits the leading shoulder 34 and securing member 35 to be pressed through the coupling aperture 17 of the shift cable end 10 without permanently deforming the bushing 30. The base 36 of the securing member 35 is of a diameter equivalent to the diameter of the leading shoulder 33 of the bushing 30. The securing member 35 has a bore 37 that leads to a seating chamber 39. In this particular embodiment, the bore 37 is cylindrical and of a diameter marginally greater than the diameter of the cylindrical portion 23 of the shift lever 20 and a height approximately equal to the height of the cylindrical portion 23 of the shift lever 20. Referring to FIG. 5, the seating chamber 39 is a truncated conical chamber that is of a shape and size marginally greater than the shape and size of the tapered portion 22 of the shift lever 20. When the shift lever 20 is installed in the bushing 30, the head 24 of the shift lever 20 extends through and beyond the bore 37 and engages with the top surface 38 of the bushing 30 to lock the shift lever 20 within the bushing 30. The cylindrical portion 23 of the shift lever 20 sits within the bore 37 and the tapered portion 22 of the shift lever 20 is seated within the seating chamber 39. The bore 37 and the seating chamber 39 are axially aligned with the bore 32 within the seating member 31.

The bushing 30 may be made of any polymer, copolymer or similar rigid material capable of being molded for the particular application and capable of withstanding the force applied on the bushing by the shift lever 20.

Figure 6:
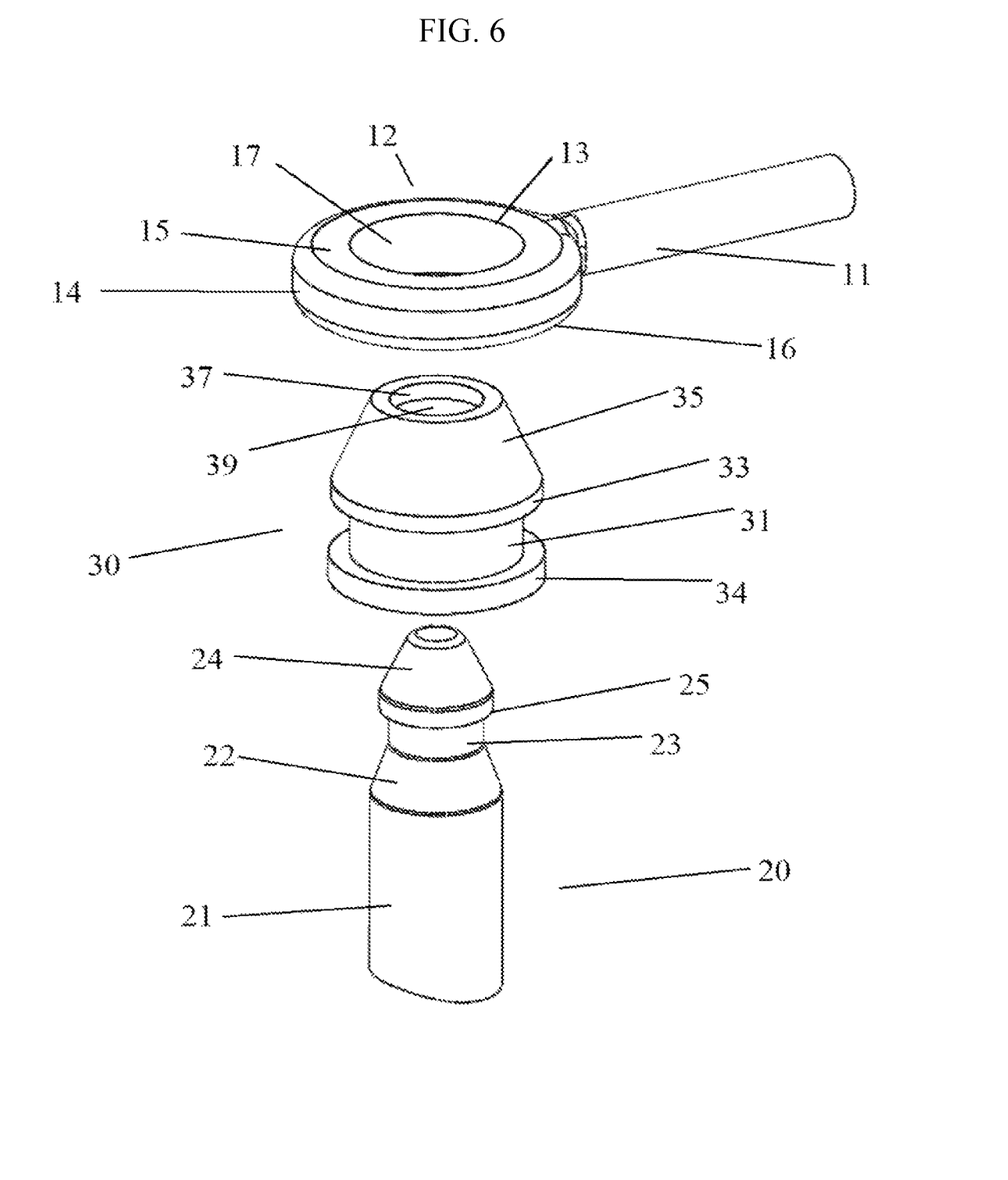
FIG. 6 is an exploded perspective illustration of an exemplary bushing, shift cable end, and shift lever.
Figure 7:
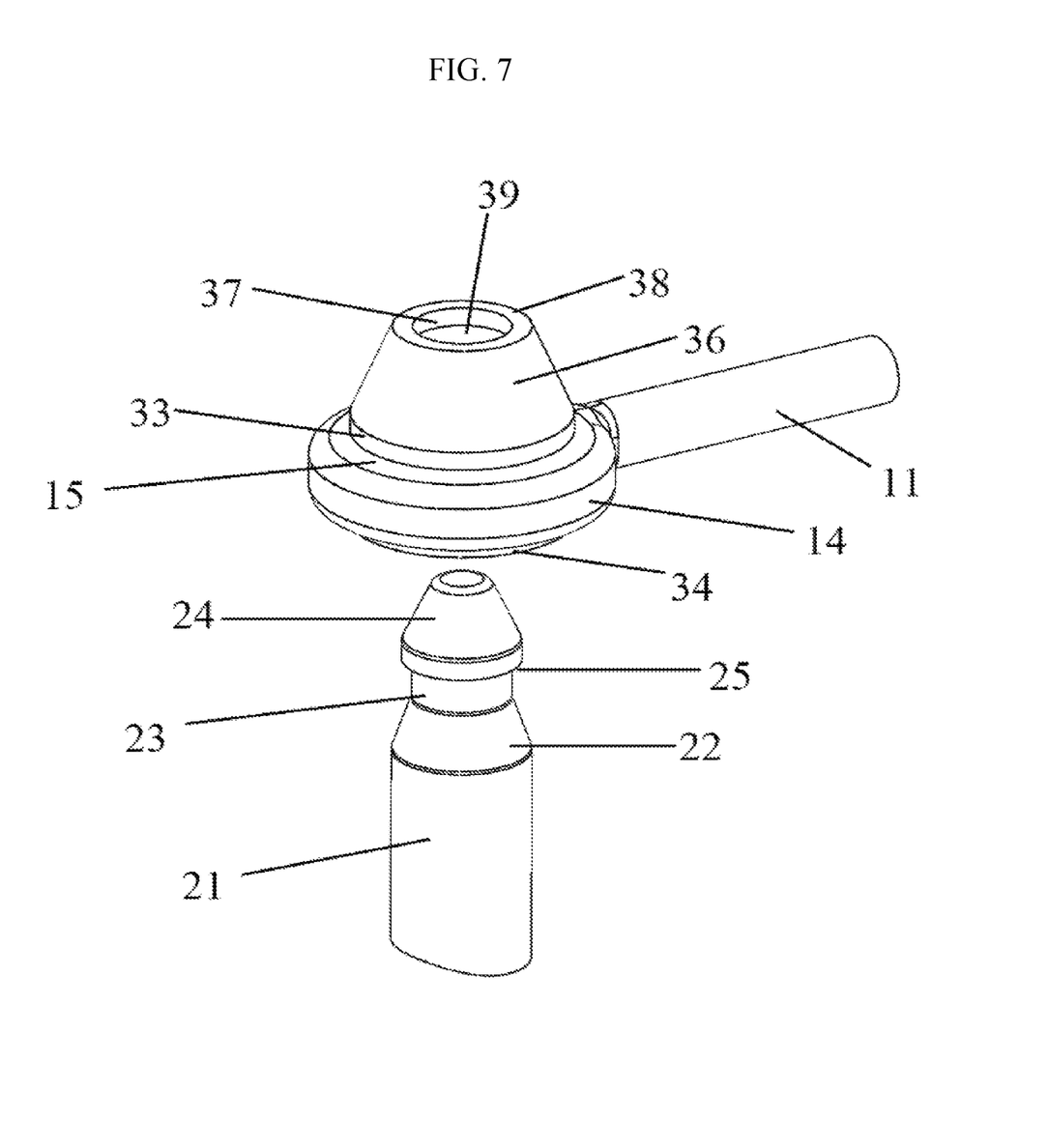
FIG. 7 is a perspective illustration of an exemplary bushing installed in an exemplary shift cable end.
Figure 8:
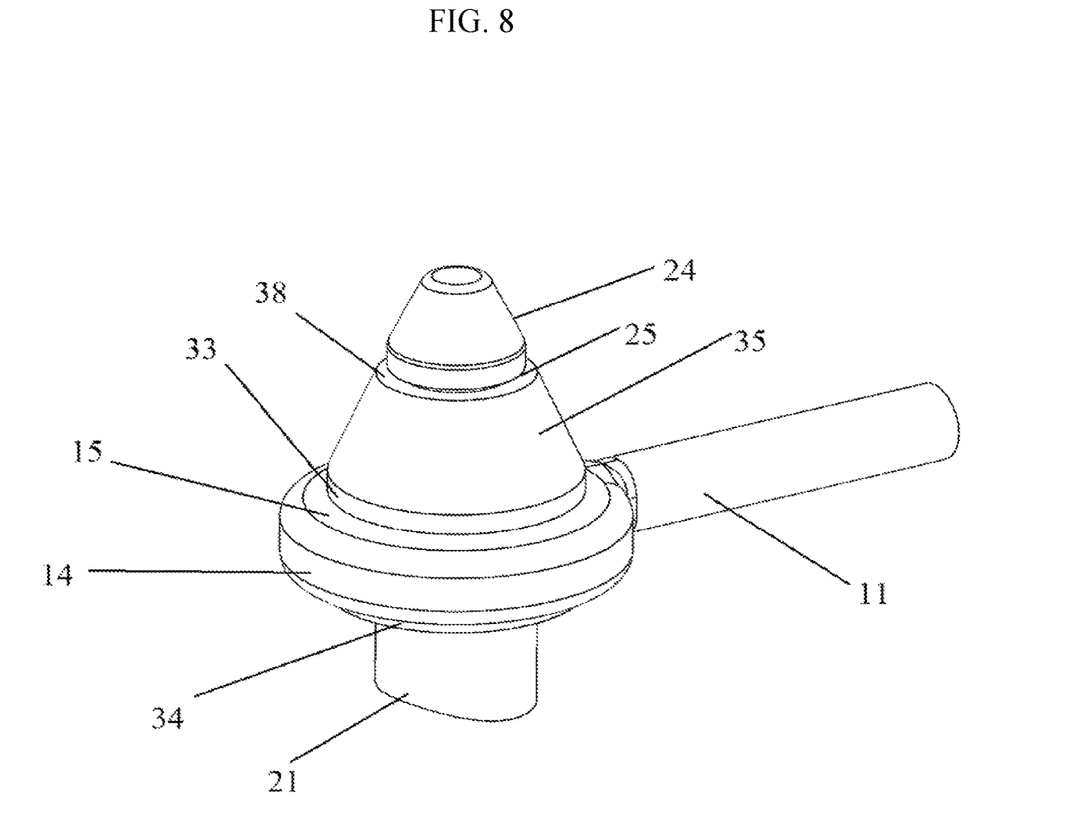
FIG. 8 is a perspective illustration of an exemplary shift lever seated in an exemplary bushing installed in an exemplary shift cable end.
Figure 9:
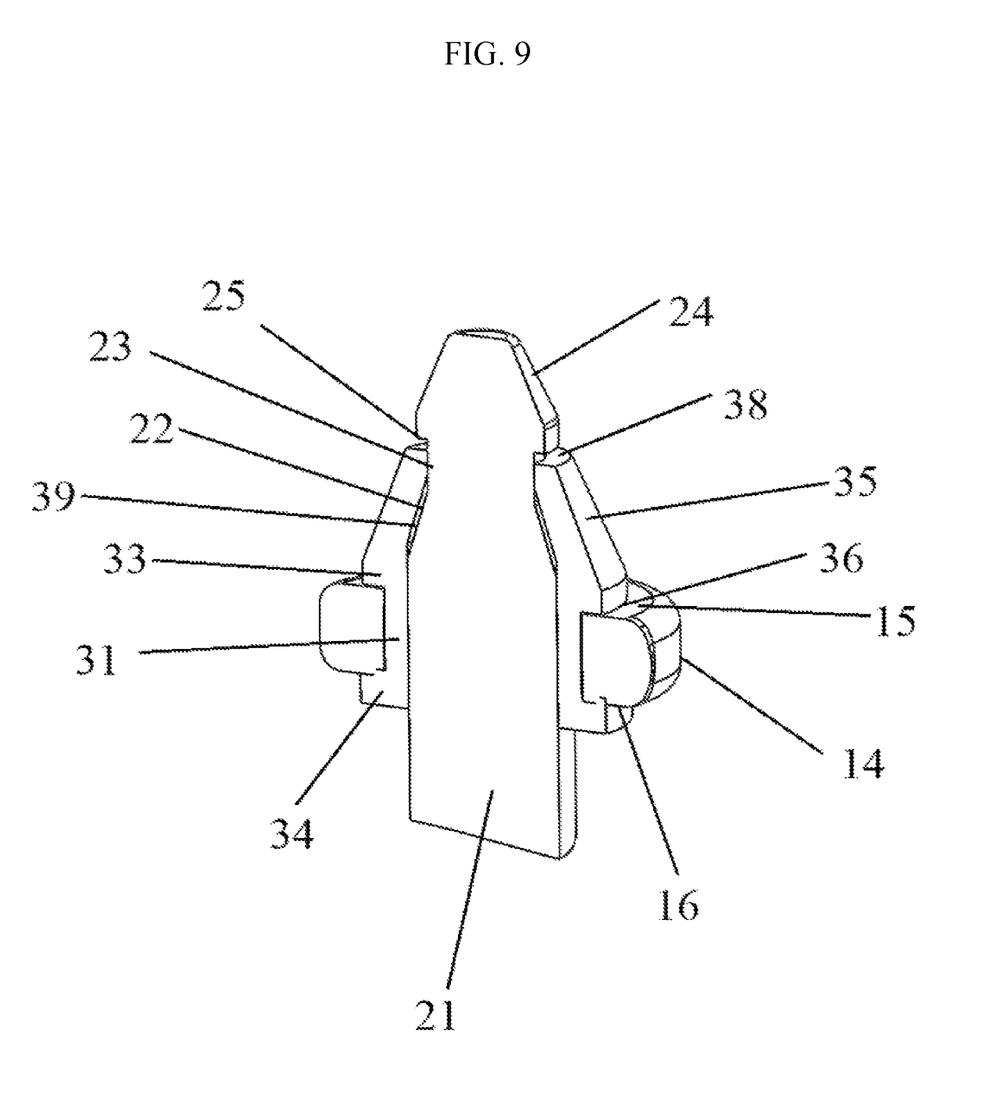
FIG. 9 is a cross-sectional illustration of an exemplary shift lever installed in an exemplary bushing.

In accordance with the present invention, FIG. 6, FIG. 7 and FIG. 8 illustrate an exemplary method to replace the degraded or damaged coupling mechanism utilizing the bushing 30 described above. The leading shoulder 33 of the bushing 30 is aligned with the coupling aperture 17 of the shift cable end 10, and the bushing 30 is inserted into the coupling aperture 17 by pressing or applying force to the trailing shoulder 34 of the bushing 30. The force applied to the trailing shoulder 34 may be applied by hand or a tool such as a socket. The bushing 30 is pressed into the coupling aperture 17 until the leading shoulder 33 and securing member 35 of the bushing 30 compress and pass through the coupling aperture 17, and expand to engage the top surface 15 of the coupling member 12. Simultaneously, the trailing shoulder 34 of the bushing 30 will engage the bottom surface 16 of the coupling member 12. With the bushing 30 fully installed in the coupling aperture 17, the shift cable end 10 is coupled with the shift lever 20 by aligning the bore 32 of the bushing 30 with the head 24 of the shift lever 20 and pressing the shift lever 20 into the bushing 30 until the head 24 of the shift lever 20 has passed through the bushing 30 such that the head 24 extends through and beyond the bore 37 and engages the top surface 38 of the securing member 35.

The foregoing merely describes the present invention in an illustrative manner. The terminology employed is intended to be merely words of description, and not of limitation. It will thus be appreciated that that those skilled in the art will be able to make numerous modification and variations of the present invention in light of the above teachings. Such modifications and variations, while not illustrated or described herein, embody the principles of the present invention, and are within the spirit and scope of the appended claims.

The invention claimed is:

1. A bushing for coupling a shift cable end and shift lever, said shift cable end comprising an elongated member and coupling member, said coupling member having a top surface, a bottom surface, and an outer surface and inner surface creating a coupling aperture, said shift lever comprising an elongated member having a tapered portion, a cylindrical portion and a head, comprising:
   a seating member configured to sit within the coupling aperture of the shift cable end, said seating member having a leading shoulder configured to engage the top surface of the coupling member and a trailing shoulder configured to engage the bottom surface of the coupling member;
   a bore running lengthwise through the seating member configured to receive at least a portion of the elongated member of the shift lever; and
   a securing member configured to receive and house the tapered portion and cylindrical portion of the shift lever and allow the head of the shift lever to extend through and over the securing member.

2. A bushing as in claim 1 wherein the seating member is a cylindrical body having a diameter approximately equal to the diameter of the coupling aperture and the bore within the seating member is cylindrical and of a diameter larger than the diameter of the elongated member of the shift lever.

3. A bushing as in claim 1 wherein the leading shoulder and trailing shoulder are cylindrical and extend radially from the leading and trailing ends of the seating member such that the longitudinal distance between the leading shoulder and trailing shoulder is equal to the distance between the top surface and bottom surface of the coupling member, said leading shoulder and trailing shoulder having diameters greater than the diameter of the coupling aperture such that, when the seating member is seated within the coupling aperture, the leading shoulder engages the top surface of the coupling member and the trailing shoulder engages the bottom surface of the coupling member.

4. A bushing as in claim 1 wherein the securing member is comprised of a truncated cone having a base and a leading side and extending longitudinally from the leading shoulder of the bushing and aligned along the longitudinal axis of the cylindrical bore within the seating member, said securing member defining a truncated, conical chamber configured to house the tapered portion of the shift lever, said conical chamber extending from the leading end of the seating member to a bore running from the conical chamber to the leading end of the securing member, said bore configured to house the cylindrical portion of the shift lever and of a diameter less than the diameter of the head of the shift lever.

5. A method for coupling a shift cable end and shift lever, said shift cable end comprising an elongated member and coupling member, said coupling member having a top surface, a bottom surface, and an outer surface and inner surface creating a coupling aperture, said shift lever comprising an elongated member having a tapered portion, a cylindrical portion and a head, comprising:
   providing a bushing having a seating member configured to sit within the coupling aperture of the shift cable end, said seating member having a leading shoulder configured to engage the top surface of the coupling member and a trailing shoulder configured to engage the bottom surface of the coupling member, a bore running lengthwise through the seating member configured to receive at least a portion of the elongated member of the shift lever, and a securing member configured to receive and house the tapered portion and cylindrical portion of the shift lever and allow the head of the shift lever to extend through and over the securing member;
   inserting the bushing into the coupling aperture by aligning the securing member with the coupling aperture and simultaneously applying a force to the trailing shoulder of the bushing sufficient to force the securing member and leading shoulder of the bushing to pass through the coupling aperture until the leading shoulder of the bushing is engaged with the top surface of the coupling member and the trailing shoulder of the bushing is engaged with the bottom surface of the coupling member; and
   inserting the shift lever into the bushing by aligning the bore within the seating member with the head of the shift lever and pushing the shift lever through the bushing until the head of the shift lever extends through and beyond the securing member of the bushing.

6. A method as in claim 5 wherein the bushing provided has a seating member that is a cylindrical body having a diameter approximately equal to the diameter of the coupling aperture and the bore within the seating member is cylindrical and of a diameter larger than the diameter of the elongated member of the shift lever.

7. A method as in claim 5 wherein the bushing provided has a leading shoulder and trailing shoulder that are cylindrical and extend radially from the leading and trailing ends of the seating member such that the longitudinal distance between the leading shoulder and trailing shoulder is equal to the distance between the top surface and bottom surface of the coupling member, said leading shoulder and trailing shoulder having diameters greater than the diameter of the coupling aperture such that, when the seating member is seated within the coupling aperture, the leading shoulder engages the top surface of the coupling member and the trailing shoulder engages the bottom surface of the coupling member.

8. A method as in claim 5 wherein the bushing provided has a securing member comprised of a truncated cone having a base and a leading side and extending longitudinally from the leading shoulder of the bushing and aligned along the longitudinal axis of the cylindrical bore within the seating member, said securing member defining a truncated, conical chamber configured to house the tapered portion of the shift lever, said conical chamber extending from the leading end of the seating member to a bore running from the conical chamber to the leading end of the securing member, said bore configured to house the cylindrical portion of the shift lever and of a diameter less than the diameter of the head of the shift lever.

* * * * *